3,169,309
METHOD FOR JOINING SHEET METAL
Robert H. Groman, East Moline, Ill., assignor to Eutectic Welding Alloys Corporation, Flushing, N.Y., a corporation of New York
Filed Sept. 18, 1961, Ser. No. 138,949
7 Claims. (Cl. 29—471.7)

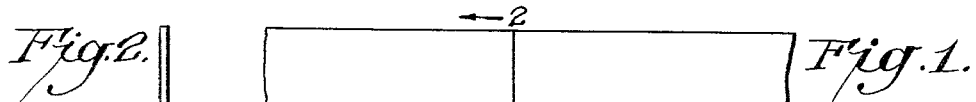
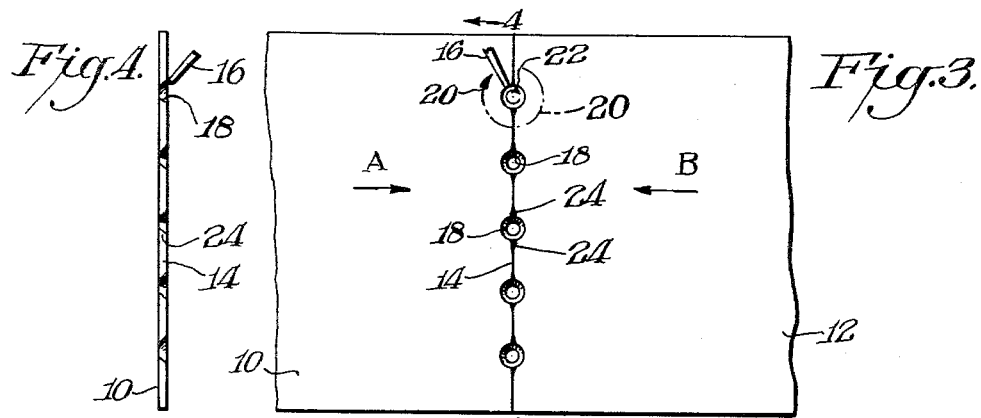
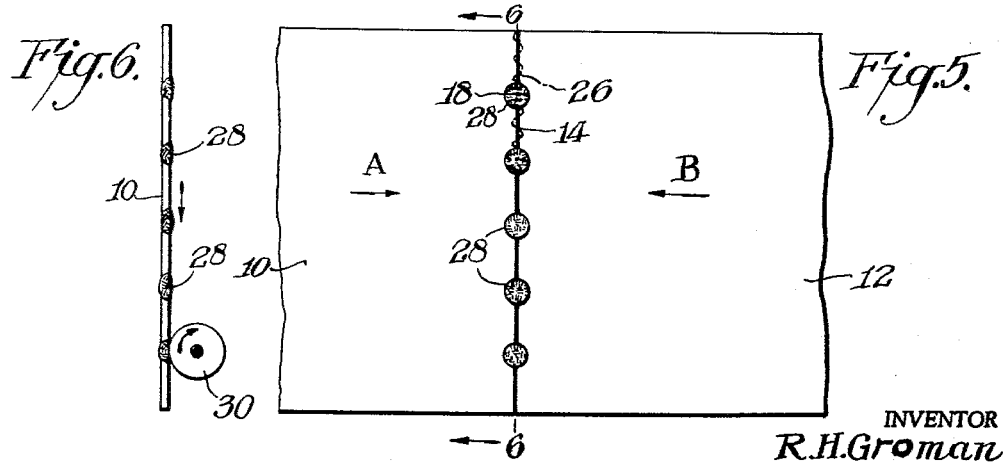

This invention relates to a method for butt welding sheet metal and it more particularly relates to such a method which can be effectively performed even when only one side of the sheets are accessible.

When butt welding pieces of sheet metal, it is very often difficult to obtain access to both sides of butted sheets upon assembled objects such as auto bodies and various types of sheet metal assemblies such as duct work. In such type of work it is also difficult to clamp or jig the members together, and it has in fact been quite difficult to provide a dependable strong joint in any case, between butted sheets of rather thin gauge metal.

An object of this invention is to provide a simple and dependable method of butt welding sheet metal;

Another object is to provide such a method which can be performed when only one side of the butted sheets is accessible; and A further object is to provide such a method which is particularly well suited for butt welding rather thin sheets of ferrous metals.

In accordance with this invention a series of small holes are burned through the butted edges of a pair of sheets of metal. This melts the base metal around the periphery of the holes and tacks the two sheets together at the spots where the burned holes cross their butted edges. These holes are particularly effective in doing so when they are made as small as possible using a small tipped gas torch held at a flat angle to the sheets and manipulated in a rapid tight circular motion to provide holes which are approximately ½" apart along the butted joint. After the holes are burned and the aforementioned tacking accomplished, weld metal is deposited in the holes which flows into the spaces between the edges of the sheets to seal the joint thereby formed between them. After this joint is completed, it may be ground flush with the parent sheet metal to provide a virtually imperceptible finished joint having remarkably great tensile strength.

Novel features and advantages of the present invention will become apparent to one skilled in the art from a reading of the following description in conjunction with the accompanying drawings wherein similar reference characters refer to similar parts and in which:

FIG. 1 is a plan view of a pair of pieces of sheet metal butted together prior to performance of the method of this invention;

FIG. 2 is a cross-sectional view taken through FIG. 1 along the line 2—2;

FIG. 3 is a schematic plan view of the hole-burning step of the method of this invention;

FIG. 4 is a cross-sectional view taken through FIG. 3 along the line 4—4;

FIG. 5 is a schematic plan view of the weld metal depositing step of the method of this invention; and FIG. 6 is a cross-sectional view taken through FIG. 5 along the line 6—6 supplemented by a schematic representation of the final grinding step of the method of this invention.

In FIGS. 1 and 2 are shown a pair of pieces of sheet metal 10 and 12 which are, for example, twenty gauge sheets of low carbon steel. Sheets 10 and 12 are butted together along straight edges to form a common butted line of contact 14, and they are fluxed and held in such alignment while, as shown in FIG. 3, a small tipped gas torch 16 is used to burn a series of holes 18 through the butted contact line 14 of sheets 10 and 12.

As indicated by arcuate arrows 20 and 22 in FIG. 3, these holes are particularly effectively made by manipulating torch 16 in a rapid tight circular motion while it is held at a relatively flat angle to the plane of the assembled sheets. The burning of holes 18 momentarily melts the base metal around them which tacks the sheets together along butted contact line 14 at spots 24 where the peripheries of burned holes 18 cross junction line 14. These holes should be made as small as possible such as approximately 3/16" in diameter, with a joint length between them of approximately ½".

The butted and tacked joint area is then fluxed to facilitate the deposition of weld metal over the joint area. As shown in FIG. 5 the weld metal is deposited in a weaving motion schematically indicated by line 26, and it fills holes 18 with beads 28. Beads 28 also flow along junction line 14 to fill and seal the entire joint between sheets 10 and 12 to provide a perfect joint between these sheets.

After deposition of the weld metal is completed, the completed joint, as shown in FIG. 6, is ground down flush with the parent sheets of metal by schematically-indicated grinding wheel 30 to provide a virtually imperceptible finished joint, which has high strength.

When suitable fluxes and weld metals are used for the parent metals of the assembled sheets, a finshed butted joint made in this manner between the two pieces of sheet metal may have a tensile strength of as much as 85,000 p.s.i. The burning of holes 18 through the butted sheets, therefore, has the unexpected dual advantages of providing a simple means of tacking the sheets together before and while the weld metal is deposited and also providing a highly convenient mode of interposing weld metal between the sheets along their slight area of edge contact. After deposition, grinding of the beads of deposited weld metal flush with the surface of the parent metal makes it virtually impossible to detect their presence or even the presence of any joint at all between the pieces of sheet metal.

What is claimed is:

1. A method of joining two abutted pieces of relatively thin sheet metal which comprises the steps of assembling said pieces side-by-side in contact with each other, maintaining said pieces butted against each other, applying a torch to burn and melt a series of holes along the line of contact through both of said butted pieces whereby said metal of said sheets around said holes is momentarily melted and tacked along said butted edges adjacent said holes, and filling said holes with weld metal which simultaneously flows into and seals the joint between said butted edges while they are held securely together by the tacking to form a strong joint between said pieces.

2. A method as set forth in claim 1 wherein said holes are burned by using a small tipped gas torch maintained at a flat angle to the plane of said pieces.

3. A method as set forth in claim 1 wherein said holes are formed by manipulating a torch in a tight circular motion.

4. A method as set forth in claim 1 wherein said holes are maintained as small as possible with a joint length of approximately ½" between them.

5. A method as set forth in claim 1 wherein a suitable flux is applied to the entire butted area before burning said holes.

6. A method as set forth in claim 5 wherein said flux is also applied to said entire joint area before deposition of said weld metal in said holes.

7. A method as set forth in claim 1 wherein said filler metal is applied in a weaving motion over said entire joint area.

References Cited in the file of this patent
UNITED STATES PATENTS

| | | |
|---|---|---|
| 1,446,274 | Roberts | Feb. 20, 1923 |
| 1,810,005 | Burnish | June 16, 1931 |
| 2,062,875 | Gardner | Dec. 1, 1936 |